United States Patent [19]

Leanna et al.

[11] 4,116,594
[45] Sep. 26, 1978

[54] EMBOSSING APPARATUS HAVING MAGNETIC ROLLER AND FLEXIBLE EMBOSSING PLATES THEREFOR

[75] Inventors: Dale D. Leanna, Oconto Falls; Allen R. Jorgensen, Townsend; Thomas R. Curro, Green Bay; Andrew M. Bray, Suamico, all of Wis.

[73] Assignee: Magna-Graphics Corporation, Oconto Falls, Wis.

[21] Appl. No.: 766,977

[22] Filed: Feb. 9, 1977

Related U.S. Application Data

[63] Continuation-in-part of Ser. No. 640,049, Dec. 12, 1975, abandoned.

[51] Int. Cl.² ............................................. B29D 7/14
[52] U.S. Cl. .......................................... 425/3; 29/124; 264/284; 425/194; 425/363; 425/385; 425/403; 425/DIG. 33
[58] Field of Search ................... 425/3, DIG. 33, 403, 425/193, 194, 363, 385, 367, 811; 101/382 MV; 264/284, 293; 72/238; 156/219, 220; 29/124, 132, 121.5, 121.6, 121.2, 121.3; 427/272

[56] References Cited

U.S. PATENT DOCUMENTS

| 1,558,206 | 10/1925 | Simpson | 425/194 |
|---|---|---|---|
| 2,081,724 | 5/1937 | Abbott | 425/194 |
| 3,264,978 | 8/1966 | Staley | 29/132 X |
| 3,668,752 | 6/1972 | Clieton et al. | 29/124 |
| 3,721,189 | 3/1973 | Bray | 425/DIG. 33 UX |
| 3,865,343 | 2/1975 | Jenkins | 425/DIG. 33 UX |

Primary Examiner—Francis S. Husar
Assistant Examiner—Mark Rosenbaum
Attorney, Agent, or Firm—James E. Nilles

[57] ABSTRACT

Apparatus for applying a continuous embossing pattern to webs of material such as paper or the like and a method for producing an embossing surface. The apparatus includes rollers which receive a web or webs of such material therebetween and removable embossing plates secured to the surface of the rollers and having an embossing surface for embossing the webs. The rollers are constructed such that they have magnetic properties whereby the embossing plates which are comprised of magnetically attracted material can be held against the roller surface. The plates are positioned in closely adjacent relationship with respect to each other such that they provide a continuous embossing pattern around the surface of the roller. The plates and the rollers also include mutually engaging registering means which permit the plates to be accurately aligned with respect to the roller surface. The plates can thus be readily removed or replaced in the event that they become worn or damaged or in the event that it is desirable to change the embossing pattern frequently. The embossing pattern can be formed in the surface of each of the embossing plates by means of a method of coating the plate surfaces with a photo-chemical resist material, laying a negative of the desired pattern over the photo-chemical coating, directing light through the negative to cause selective deterioration of the coating, and subjecting the plate to a caustic chemical, wash chemical, or etchant to etch the desired pattern into the surface of the plate. The plate may, if necessary, be further machined in order to increase the depth of the etching and to improve the definition and clarity of the embossing pattern.

6 Claims, 21 Drawing Figures

EMBOSSING APPARATUS HAVING MAGNETIC ROLLER AND FLEXIBLE EMBOSSING PLATES THEREFOR

REFERENCE TO RELATED CO-PENDING APPLICATION

This is a continuation-in-part application from Ser. No. 640,049; filed Dec. 12, 1975 and now abandoned.

BACKGROUND OF THE INVENTION

The present invention relates to apparatus of the type used in embossing or similarly deforming lengths of web material such as paper or the like and to methods for producing an embossing surface in the embossing apparatus. More particularly, the invention pertains to improvements in embossing rollers which receive lengths of web material therebetween in such a manner that the web material is embossed as it passes through the rollers.

The prior art apparatus used for embossing and intended to apply a continuous embossing pattern to a web generally comprised at least a pair of opposed embossing rollers which have an embossed pattern etched or machined directly into the surface of at least one roller. Rollers of this type are advantageous in that they can impart a continuous embossing pattern to the web without breaks or interruptions. However, rollers of this type have proved to have a variety of disadvantages which make them unduly expensive to manufacture and to maintain in operation. For example, either as a result of continued use or as the result of foreign materials passing through the rollers, the embossing patterns on the rollers often become worn or damaged. In order to regrind, remachine or otherwise repair the embossing pattern, it is necessary to remove the entire roller or rollers from the embossing machine. The removal process itself causes the embossing machine to be out of operation for sometime and is thus costly and the actual process of repairing the embossing pattern on the surface of the rollers is also expensive. Because wear and damage to the rollers is somewhat prevalent, it is also generally necessary to maintain at least one extra pair of rollers on hand to minimize down time during repair. Furthermore, when the embossing patterns have been worn to the point where there is no longer enough of the roller surface material remaining to permit further regrinding or remachining or when there has been major damage to the rollers, it is generally necessary to either replace or to completely rebuild the roller and replace or recut the roller gears. Another drawback to the prior art embossing rollers is that in many cases one particular area will wear at a much greater rate than the remainder of the embossing surface. Due to economic considerations, the rollers are frequently used despite this wear and until the entire surface of the rollers have been sufficiently worn to warrant regrinding or replacement. Until regrinding or replacement is feasible, the worn area of the rollers will produce an embossing pattern of inferior quality.

An additional drawback of the prior art rollers is that, in the event it is desired to change the embossing pattern applied to the web, it is necessary to remove the patterned rollers from the machine. As previously stated, the process of exchanging rollers is often unduly time consuming and costly.

It is known to use means such as magnetic cylinders to support independent or separate printing plates or die cutting plates. The following U.S. patents, for example, disclose magnetic cylinders used for printing and magnetic printing plates for use therewith: U.S. Pat. Nos. 3,721,189; 3,885,498; 3,824,927; 3,882,775; 3,885,497; 3,820,460; 3,670,647; and 3,837,959. However, it should be realized that printing and embossing differ both as regards the equipment employed and the nature of the process. For example, printing involves laying ink on the surface of a web by means of a printing roll, with the web being supported by a back-up roll or the like, and no physical deformation of the web is carried out. However, in embossing it is necessary to physically deform the web passing between a pair of embossing rollers which have projections which interengage and, as a result, the embossing roll surfaces are subjected to physical forces not involved in printing processes. Due to the problems inherent in embossing such as the higher pressures which must be applied by embossing rollers to a web, no satisfactory means have previously been developed for magnetically mounting an embossing plate on a supporting cylinder or for producing a suitable removable embossing plate or for effecting accurate alignment of such embossing plates prior to and during the embossing operation.

SUMMARY OF THE INVENTION

The present invention provides an improved embossing apparatus which includes a continuous embossing pattern around the surface of the embossing rollers which readily facilitates replacement or repair of the embossing surface without unnecessary cost and down time, and which also permits rapid and inexpensive substitution of embossing patterns. The invention includes embossing rollers which are constructed to have magnetic properties and which support removable flexible embossing plates received against the surface of the rollers and secured by the magnetism of the rollers. The invention also includes a method for forming the desired embossing pattern in the plate surfaces. This method of producing the pattern in the plates in combination with the concept of using removable plates which are rigidly secured to the surface of a supporting roller result in substantial improvements over prior art embossing means.

It is generally advantageous that the embossing plates applied to the surface of the magnetic rollers comprise a plurality of relatively small plates which are received in closely spaced adjacent relationship with respect to each other in such a manner that they can, if desired, completely cover the surface of the rollers. Each of the plates is provided with the desired embossing pattern etched or otherwise formed in its surface and includes a thin backing portion comprised of a material which is attracted to the magnetic rollers or cylinders.

By securing the embossing plates to the rollers magnetically, it is possible to rigidly secure the plates in place without using means which cause interruptions in the embossing pattern. It is also possible to quickly remove or replace the embossing plates in the event that they are damaged or become worn and it is unnecessary that the rollers be removed from the machine in order to permit replacement or substitution of the embossing surface. In order to provide a completely new embossing surface, it is necessary only to replace the embossing plates thereby eliminating the need for substitute rollers and avoiding the unnecessary down time required to remove the rollers from the machine. Use of removable plates thus facilitates frequent changes of the embossing pattern if desired.

The embossing surface can be formed on the embossing plates by a variety of methods such as electrical discharge machining, chemical milling, knurling, engraving, general machining, laminating, plating or any combination thereof. However, it is particularly practical to produce the embossing pattern in the plates through a process using a combination of etching and machining. A photo-chemical coating or resist material can be applied to the plate surface and a negative including the desired pattern can be placed over the photo-chemical coating. Light is then applied through the negative to cause a breakdown of the photo-chemical coating. When the plate is then subjected to a caustic chemical or other etchant, very accurate etched reproductions of the pattern are produced in the plate surface. The same negative can be used repeatedly to produce a plurality of plates having identical embossing patterns etched into their surfaces. The plate can then be mounted on a magnetic roller which is positioned in a lathe or the like and further machined in order to provide greater depth to the pattern and to generally improve its definition and quality. By using removable plates as the medium for supporting the embossing surface per se, it is possible to use this photoetching process to form the desired embossing pattern and thus to produce a better embossing pattern and at less cost than is generally possible when the pattern is machined directly into the surface of the roller.

A particular difficulty inherent in embossing is that in many cases it is desirable that the projections or knuckles which comprise the embossing pattern must be very accurately aligned with respect to each other and with respect to the projections or knuckles on the opposing embossing roller. In conventional machining techniques, as the machining tool traverses the length of the roller to form the embossing pattern in the surface of the roller, the error in the position of the tool accumulates. The present invention embossing means provides for a more accurately formed embossing pattern by forming the pattern in the removable plates using the photo-etching process described and by providing an improved plate registering means for accurately aligning each of the plates on the surface of the magnetic rollers. As a result, the projections or knuckles of the opposed embossing patterns can be more accurately aligned with respect to each other.

The present invention thus provides embossing rollers having removable plates which can be readily replaced in the event that the embossing surfaces become worn or damaged or which can be readily substituted in order to change the embossing pattern and without requiring the removal of the rollers from the embossing machine thereby eliminating the need for substitute rollers and avoiding unnecessary down time. The method of the invention of using a photo-resist means of etching the embossing pattern into the plates also facilitates exact reproduction of the desired pattern in each of the plates manufactured since the negative can be used repeatedly thereby providing a system for insuring exact reproduction of the pattern from plate-to-plate, and when combined with a precise means for registering the plates on the rollers, provides a means for insuring improved product quality. Because individual plates can be quickly replaced, any localized area of the embossing pattern which is damaged or worn can also be replaced without removing the rollers from the embossing machine. Furthermore, once the embossing machine has been fitted with magnetic rollers, they would not have to be removed from the machine for plate replacement or substitution thereby eliminating unnecessary labor and reducing down time.

A description of several preferred embodiments of the invention is set forth hereafter. It should be noted that the particular embodiments described are merely examples of the invention and the scope of the invention further includes other embodiments not inconsistent with the claims.

DESCRIPTION OF THE PREFERRED EMBODIMENTS

Figure 1:
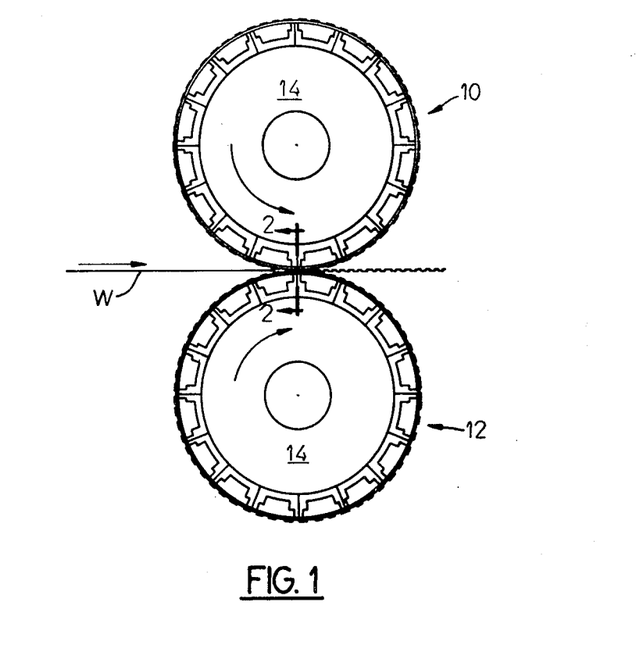
FIG. 1 is a side elevation view of one embodiment of the invention and including a pair of embossing rollers of the present invention receiving a web therebetween.

FIG. 1 illustrates the embossing rollers 10 and 12 of an embossing machine receiving a web W of material such as paper or the like. The embossing rollers are provided with an embossing pattern comprised of a plurality of projections or knuckles 13 on their cylindrical surfaces and receive the web W therebetween in such a manner that the projections of the embossing pattern deform the web as it passes between the rollers 10 and 12 in the manner shown in FIG. 2 and impart an embossed pattern to its surface.

Figure 3:
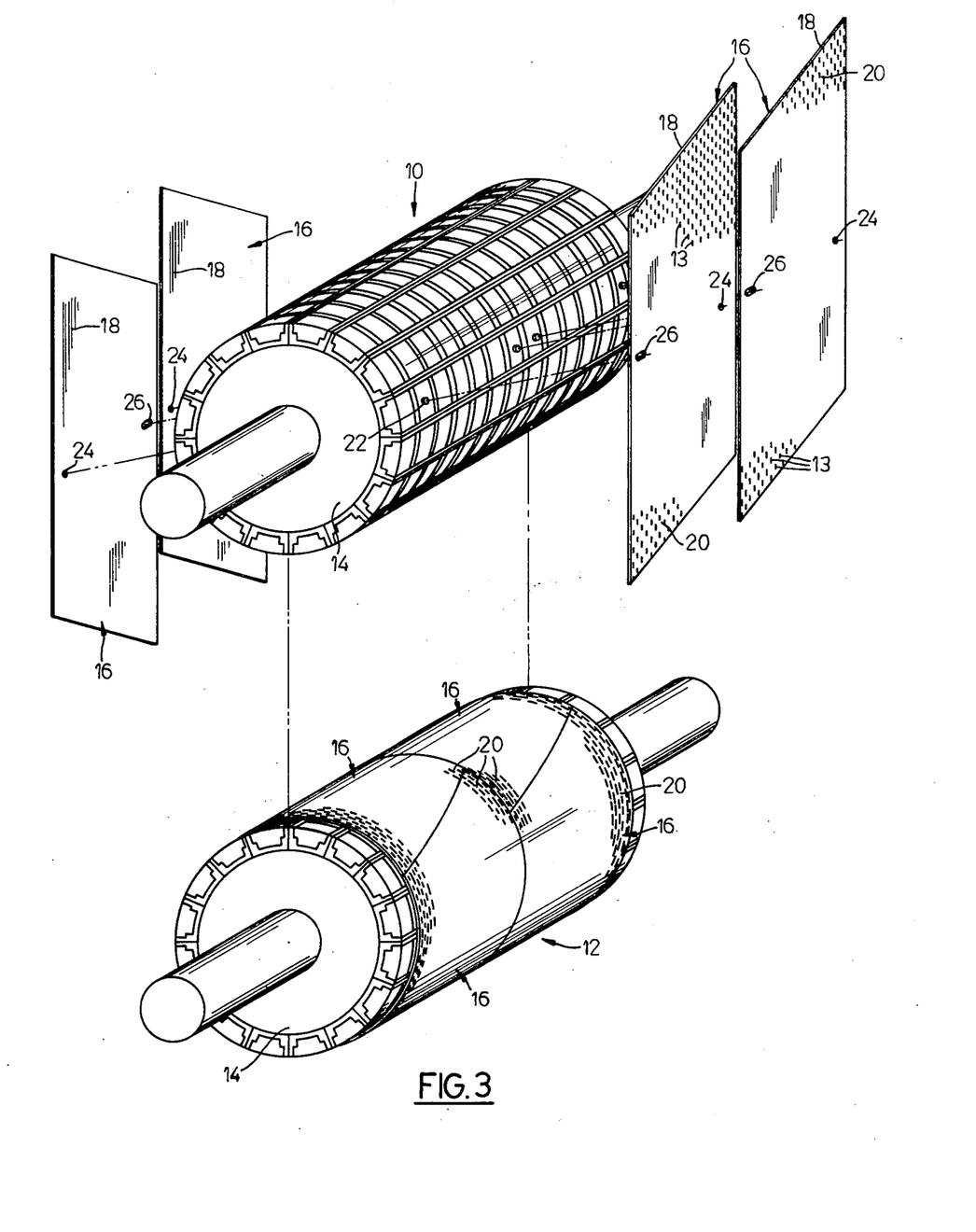
FIG. 3 is an exploded isometric view of the magnetic rollers shown in FIG. 1 and more clearly showing the construction of the embossing plates received on the magnetic cylinders.
Figures 4, 6, 7, 8:
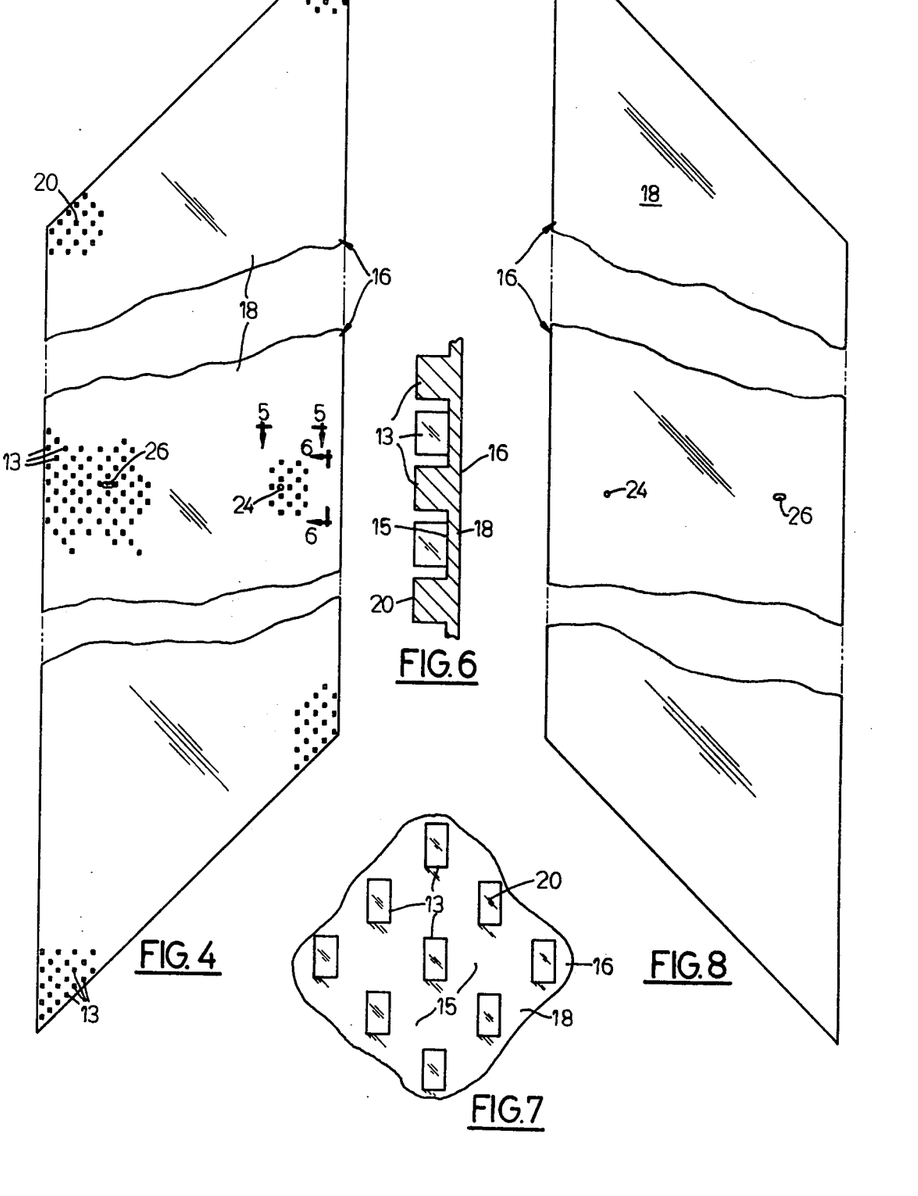
FIG. 4 is a plan view of an embossing plate of the present invention.
FIG. 6 is an enlarged cross-sectional view taken along the line 6—6 in FIG. 4.
FIG. 7 is an enlarged view of the portion of the embossing surface of the plate shown in FIG. 4.
FIG. 8 is a view of the bottom surface of the plate shown in FIG. 4.
Figure 5:
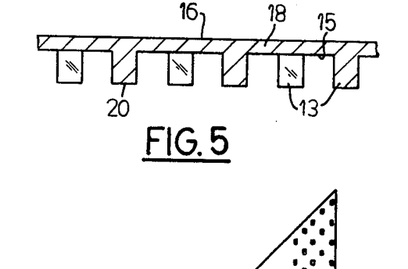
FIG. 5 is a cross-sectional view taken along the line 5—5 in FIG. 4.

As shown in greater detail in FIGS. 3 and 4, the embossing rollers 10 and 12 are each comprised of magnetic cylinders 14 in combination with a plurality of relatively thin embossing plates 16 which are securely but removably received against the surfaces of the magnetic cylinders 14. The cylinders 14 are constructed to be receivable in the embossing machine in a conventional manner and include well-known gearing means at their ends (not shown) whereby they can be driven. The magnetic cylinders 14 can be constructed in the manner shown in U.S. Pat. No. 3,721,189, issued Mar. 20, 1973 to Bray. Other types of magnetic cylinders are also equally adaptable for use in the present invention and the magnetic cylinder of Bray is cited only as an example of those which can be used.

The embossing plates 16 which are received against the surface of the magnetic cylinder are best shown in FIGS. 3-9. The plates 16 generally include a thin backing portion 18 and a web engaging surface portion 20 comprised of the projections or knuckles 13 separated by grooves 15 and arranged in an embossing pattern. The backing plate portion 18 is generally comprised of a ferromagnetic material or of some other material which is similarly attracted to the magnetic surface of the magnetic cylinder 14. The ferromagnetic backing portion 18 can vary in thickness, however, it is desirable that it be of such a thickness that it will be sufficiently flexible to conform to the surface configuration of the magnetic cylinder 14 when applied thereto. The plates 16 can also be constructed to be relatively rigid and then precurved to conform to the surface contour of the cylinder 14. The projections 13 comprising the web engaging surface portion 20 of the embossing plates can be formed in any well known manner by cutting away the material between the desired projections. Etching, electrical discharge machining, chemical milling, engraving or general machining are examples of methods which can be used to form the embossing surface. It is particularly desirable, however, to form the embossing plates 16 using a process including etching and subsequent machining as will be described hereafter.

As shown in FIG. 3, the embossing plates 16 are substantially smaller in surface area than the surface of the cylinder 14 and can be constructed to be approximately 5 inches wide and 19 inches long. Other sizes would, of course, be equally useful in other applications. The embossing plates 16 could, of course, be made from a single sheet sufficiently large to cover the entire surface area of the cylinder 14 or from several large pieces, but it has been found to be advantageous to use a plurality of smaller plates as shown in the drawings for the following reasons. Since the size of the surface area of the plates 16 determines the magnetic force applied, the use of smaller plates facilitates their application and removal. The smaller embossing plates are also somewhat easier to manufacture than larger plates and they are less costly to replace in the event that there is localized damage to the embossing surface. Furthermore, in the event that there is localized wear to the embossing surface, the arrangement of the embossing plates 16 covering the surface of the cylinder 14 can be changed to distribute the wear evenly to the respective plates.

It is particularly desirable that the embossing plates 16 can be received together in closely adjacent position, i.e., contiguous relationship, as shown in FIG. 3, such that there are no interruptions or other inconsistencies in the embossing surface defined by the several plates. The plates shown are shaped to comprise a parallelogram but, in other applications, it may be advantageous to construct the plates to include a periphery having a scalloped or otherwise irregular periphery in order to provide an uninterrupted embossing pattern. The particular shape defined by the irregular contours can be any shape compatible with the particular design of the embossing pattern thereon.

Figure 2:
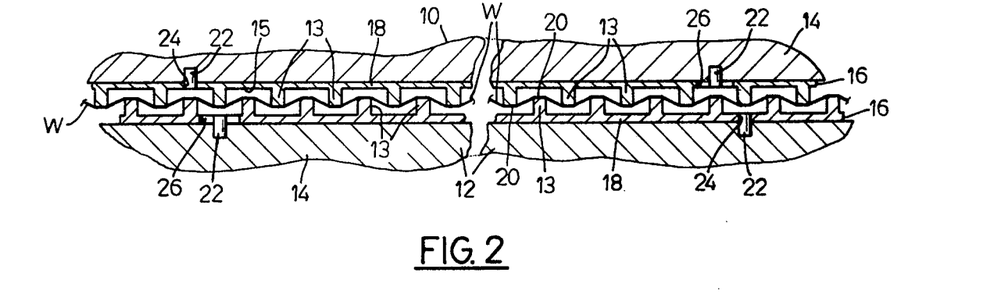
FIG. 2 is an enlarged cross-sectional view taken along the line 2—2 in FIG. 1.

In order to further facilitate and maintain alignment of the plates 16 on the magnetic cylinder 14, the embodiment of the invention shown in FIGS. 2 and 3 shows the magnetic cylinder 14 as including a plurality of small projections 22 extending outwardly from its surface and aligned longitudinally parallel to the axis of the cylinder. The projections 22 are tightly received within complementary bores 24 and 26 in the plate backing portions 18 and are received in closely fitting relationship within these bores in such a manner that the embossing plates are secured against any sliding movement with respect to the cylindrical surface and with respect to other embossing plates disposed on the opposing cylindrical surface. More specifically, the bores located in the embossing plates comprise a circular bore 24 at one side of the plate and a complementary slot 26 located at the other side of the plate.

Figure 14:
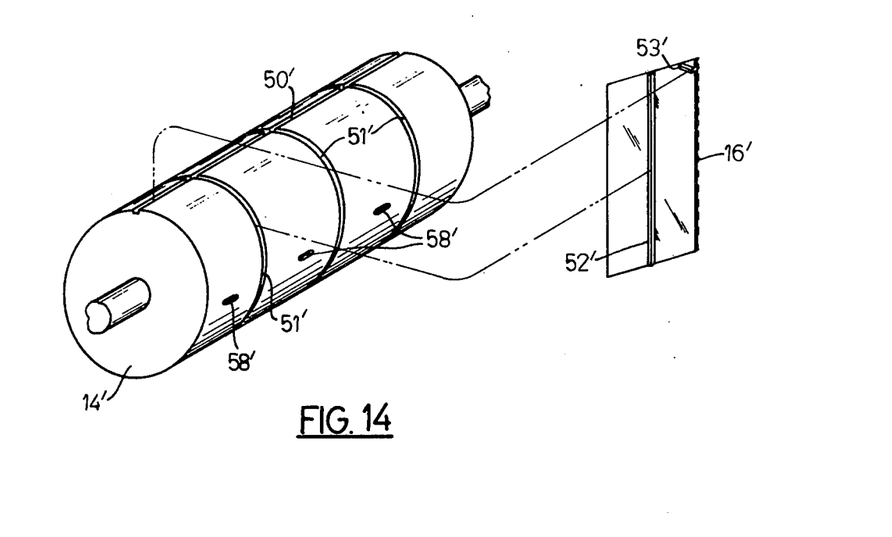
FIGS. 14 and 15 are exploded isometric views of alternative embodiments of the invention.
Figure 15:
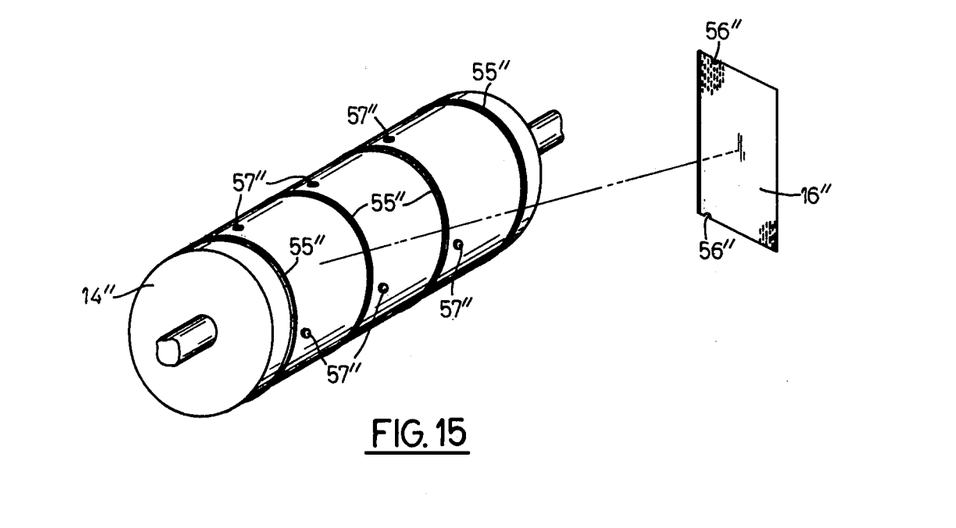

Other similar means for registering the embossing plates 16 in accurate alignment on the magnetic rollers are illustrated by the alternative embodiments of the invention shown in FIGS. 14 and 15. FIG. 14 is a simplified view of the magnetic roller 14', but showing an axially extending slot or groove 50' and a plurality of spaced circumferentially extending slots 51' formed in its surface. The slots 50' and 51' are designed to receive complementary ribs 52' and 53', respectively, which extend from the surface of the plate backing portion 18' thereby securing the plates 16' against circumferential or longitudinal movement with respect to the surface of the roller. The ribs 52' and 53' can be formed by bonding ribs to the back plate portion or by an etching process such as that which may be used to form to the embossing pattern in the opposite surface of the plate. As an alternative to the single continuous axially extending slot 50', the roller 14' could also be provided with a plurality of short slots 58' spaced along the length of the roller and designed to receive complementary ribs 53' extending from the backing portion of the plates 16'.

FIG. 15 illustrates another alternative means for registering the embossing plates 16" wherein the magnetic cylinder 14" is provided with a plurality of parallel, circumferentially extending ribs 55" which are spaced to receive the plates 16" therebetween. The ribs 55" project from the surface of the cylinder by a height approximating the thickness of the backing portion of the plate 16". In order to provide means to align the plates 16" with respect to the circumference of the cylinder 14", the plate 16" includes semi-circular indentations 56" for receiving a portion of a projecting pin 57" secured to the surface of the roller 14".

Figure 9:
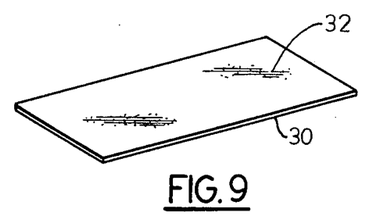
FIGS. 9-13 illustrate schematically the method of the present invention for forming an embossing surface in a removable embossing plate.
Figure 10:
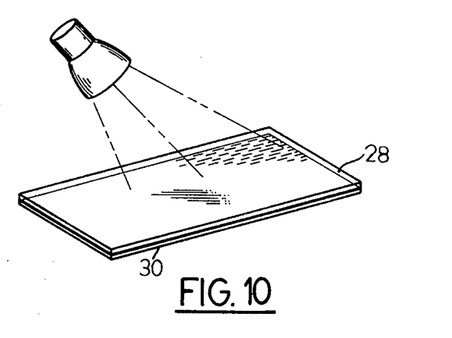
Figure 11:
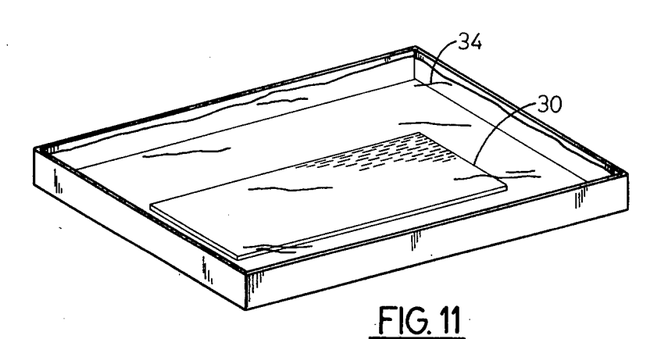

As previously stated, the embossing pattern can be formed in the plates 16 in any well known manner such as etching, electrical discharge machining, chemical milling, engraving, laminating, plating, knurling or general machining. It has been found, however, to be particularly advantageous to produce the embossing pattern in the plate by means of a method including an etching process followed by a machining process, as illustrated in FIGS. 9-13. This process is carried out by first making an enlarged photograph of one of the projections or knuckles which is to comprise the embossing pattern. The photograph is reduced in size and reproduced using conventional step-and-repeat apparatus to form a negative 28 which includes a plurality of identical images of the projections very accurately arranged in the desired pattern. As shown in FIG. 9, a piece of plate stock 30 of the desired size is then covered with a photo-chemical coating 32 which comprises a resist material, and the negative 28 formed by the step-and-repeat process, is laid over the photo-chemical coating 32. Light is then applied through the negative 28, as shown in FIG. 10, causing deterioration of that portion of the photo-chemical coating 32 struck by the light. The negative 28 is then removed and the plate is subjected to a caustic material 34 such as an acid bath, chemical wash or etchant as shown in FIG. 11. The portion of the photo-resist coating 32 which is contacted by the light passing through the negative will deteriorate such that the caustic material is permitted to dissolve specific portions of the plate while the resistive coating 32 will protect other portions of the plate. The result is a configuration of projections 13 very accurately duplicating the pattern of the negative. The negative 28 can be repeatedly reused on subsequent plates 30, each time producing an embossing plate 16 having an embossing surface very nearly identical to the previous plate.

Figure 12:
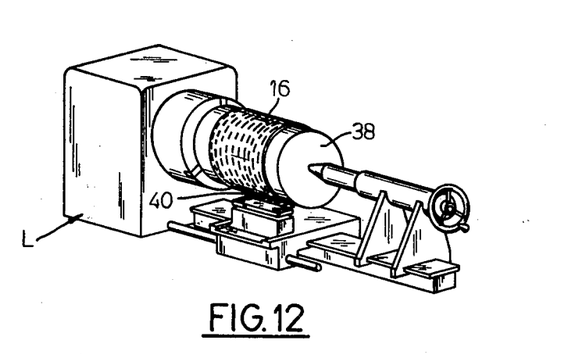
Figure 13:
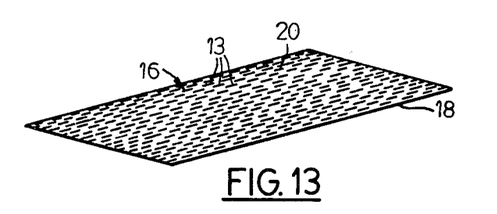

In the event that the projections 13 are to be closely spaced, it is sometimes necessary to further machine the etched plate, as shown in FIG. 12, in order to provide sufficiently deep grooves 15 between the projections 13. The etched plates are mounted on a magnetic roller 38 disposed in a lathe L or the like. The bores 24 and 26 in the backing portion 18, can be used to accurately align the plates in the same manner as they can be aligned on the magnetic cylinders 14 and by providing the magnetic roller 38 with aligned projections (not shown) extending from its surface. A plurality of rigidly secured cutting tools 40 are mounted in side-by-side relation so as to be received between the projections of knuckles 13 formed during the etching process. As the magnetic roller 38 and the etched embossing plates supported thereon are turned, cutting tools 40 function to both clarify the shapes of the knuckles 13 and to form deeper grooves 15 therebetween. The plates can then be removed from the magnetic roller 38 and repositioned in order to permit similar machining but in a different direction.

Figure 16:
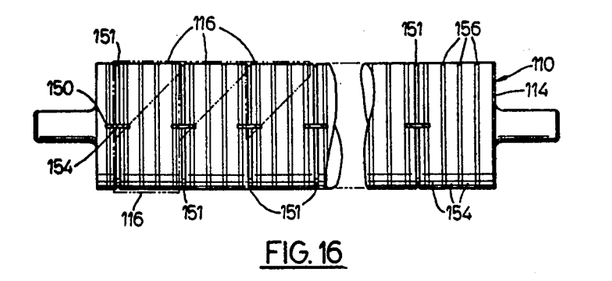
FIG. 16 is a plan view of another embossing roller in accordance with another embodiment of the invention.
Figure 17:
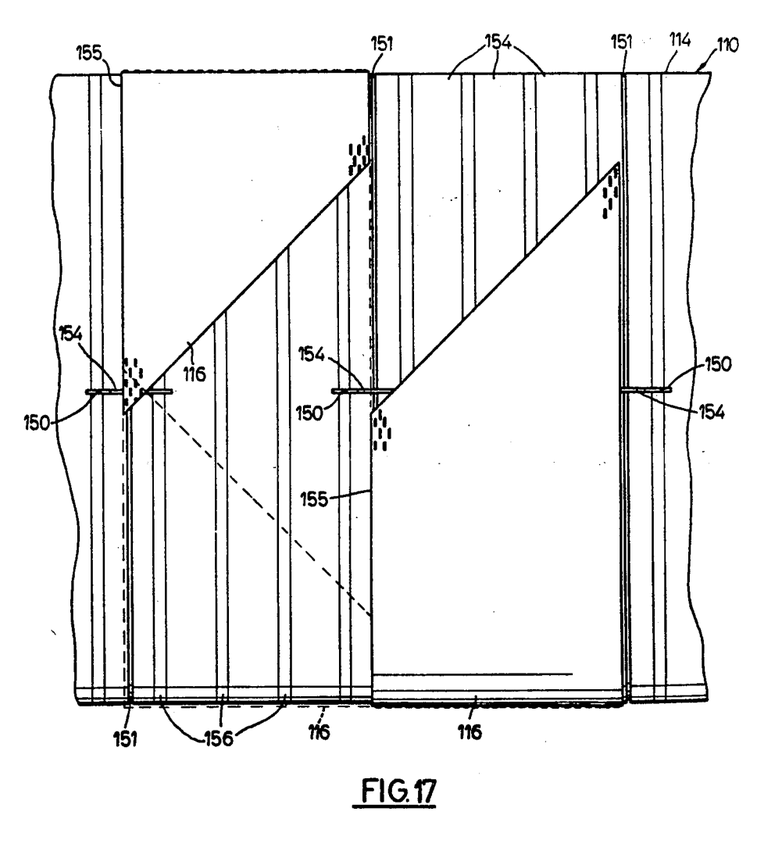
FIG. 17 is an enlarged plan view of a portion of the roller and a plate shown in FIG. 16.
Figures 18, 19, 20:
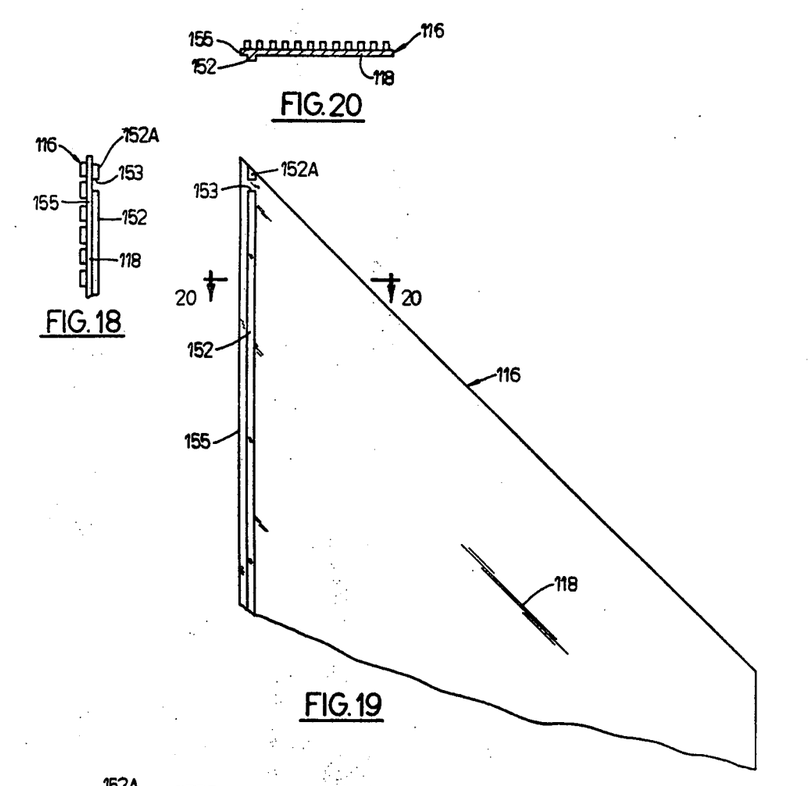
FIG. 18 is a side elevational view of one end of the embossing plate shown in FIGS. 16 and 17.
FIG. 19 is a plan view of the rear of one end of the embossing plate shown in FIGS. 16, 17, and 18.
FIG. 20 is a view taken on line 20—20 of FIG. 19.
Figure 21:
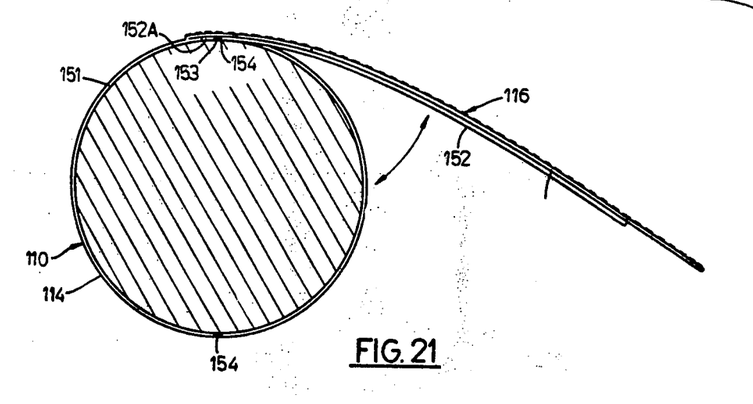
FIG. 21 is an elevational view of the end of the roller shown in FIG. 16 and further showing a plate such as shown in FIGS. 16-20 in the process of being attached to the roller.

Referring to FIGS. 16–21, there is shown another embodiment of the present invention. FIGS. 16 and 17 show an embossing roller 110 which is slightly different in construction than the embossing rollers 10, 12, 14', and 14" hereinbefore described. Embossing roller 110 comprises a magnetic cylinder 114 and a plurality of magnetically attachable removable flexible steel embossing plates 116. The magnetic cylinder 114 is made up of alternately arranged, flat cylindrical steel segments 154 and similarly shaped aluminum segments 156. Magnetic cylinder 114 is provided with two rows of axially arranged slots or grooves 150 which are located on opposite sides of the cylinder from each other. Each row comprises a plurality of grooves 150 which are spaced apart from each other along the roller axis and extend in the direction of the roller axis. Magnetic cylinder 114 is also provided with a plurality of circumferential grooves 151 which are spaced apart from one another along the axis of the cylinder. Preferably, each circumferential groove 151 is located in a steel segment 154, rather than in an aluminum segment 156. Such location is preferred because the grooves 151 are formed by machining and it is easier to provide a groove of controlled dimension and having smooth edges in steel rather than aluminum.

As FIGS. 16 and 17 best show, each intersection of a circumferential groove 151 with an axial slot or groove 150 is provided with a steel key 154 which is force-fitted in slot 150 at the intersection. Each key 154 is arranged so that its upper or outer surface is flush with the cylindrical surface of the magnetic cylinder 114. Each key 154 serves as a means to align and facilitate attachment of an individual embossing plate 116 to the magnetic cylinder 114, as hereinafter explained in detail.

Each plate 116 is provided with means to facilitate proper registration and accurate alignment thereof with other plates 116 of roller 110 and with the magnetic cylinder 114. Such means comprise a rib 152 which projects from the rear surface (see FIG. 19) of backing portion 118 of plate 116. The rib 152 is parallel to and spaced a short distance inwardly from a side edge 155 of plate 116. The rib 152 is adapted for engagement with a circumferential groove 151 in magnetic cylinder 114. The rib 152 can be formed by etching the rear surface of plate 116 or can be formed by machining the plate or can be formed by securing the rib to the plate as by brazing or welding or similar processes. Rib 152 is provided near one end thereof with a notch 153 which is engageable with a key 154 in magnetic cylinder 114. As FIG. 21 makes clear, when a flexible plate 116 is to be attached to magnetic cylinder 114, the plate 116 is held in such a manner as to place notch 153 into engagement with a key 154. As this is carried out, the portion of the rib 152 above the notch 153 (designated by the numeral 152A in FIGS. 18 and 19) is placed in engagement with a portion of a circumferential groove 151 immediately adjacent one side of a key 154, as shown in FIG. 17, thereby ensuring that the remaining portion of rib 152 will be automatically aligned with circumferential groove 151 on the other side of key 154.

It is to be understood that the forces of magnetic attraction between the magnetic cylinder 114 and a plate 116 are very strong and such forces tend to quickly and forcefully draw and bend the flexible plate 116 against the cylindrical surface of magnetic cylinder 114. Such forces are strong enough to overcome pulling forces imposed in the opposite direction by the machine operator attempting to put the plate 116 in position. Therefore, it is important that proper positioning of the plate 116 and proper alignment thereof with respect to other plates and to the magnetic cylinder 114 be established initially before these strong magnetic forces come into play and cause a plate 116 to be magnetically secured to magnetic roller 114 in improper, non-aligned relationship. In the arrangement shown in FIGS. 16–21, the notch 153 in rib 152 is located very close to the end of the plate 116 in the region where the triangularly shaped end of the plate has greater flexibility. This permits the operator to easily effect engagement of the notch 153 with the key 154 and to establish proper alignment of rib 152 with respect to circumferential groove 151 before the plate 116 is forcefully and rapidly drawn against and wrapped around the magnetic cylinder 114 by magnetic force.

As FIGS. 16 and 17 show, each plate 116 engages only one key 154 and one groove 151. Furthermore, in FIGS. 16 and 17, it will be understood that two plates 116 placed end-to-end would completely encompass the circumference of roller 114 and only two keys 154, disposed 180° apart on the roller, would permit such an arrangement. However, other arrangements could be employed, such as three or more plates disposed end-to-end to encompass the roller, with a corresponding number of keys — one for each plate being provided and disposed at an appropriate angular spacing on the roller.

Resume

By constructing the rollers 10 and 12 to include magnetic properties which can function to rigidly secure a plurality of embossing plates 16, the cost of producing and maintaining the embossing apparatus is substantially lower than was possible with the prior art apparatus. Though other means of securing embossing plates 16 to the surface of an embossing rollers are feasible, by using a magnetic cylinder 14, it is possible to position the plates in closely adjacent relationship to avoid any discontinuities in the embossing pattern and to thereby avoid interruptions, etc., in the pattern imparted to the web W. Other fastening means previously known for securing a plate to a cylinder, for example, bolts or clamping means, resulted in some form of inconsistencies in the embossing pattern applied to the web.

The use of embossing plates which can be removed from the rollers for machining or for replacement results in readily apparent advantages. For example, once the magnetic rollers have been installed in an embossing machine, it is unnecessary that they be removed even in the event of wear or damage to the embossing surface since it is only necessary to remove the plates. Furthermore, in the event of localized wear of the embossing surface, the particular plates which become worn can be replaced without requring replacement of the entire embossing surface. The plates can also be removed from and replaced on the rollers much faster than a roller can be removed from and replaced on the machine thereby decreasing the down time required for such replacement and facilitating frequent changes in the embossing pattern if desired. The storage required for keeping the replacement embossing plates is also substantially less than is needed for storing replacement rollers. Finally, production of the plates can be accomplished at less expense and the finished plates can be provided with a more accurately produced pattern and with more consistent uniformity.

I claim:

1. An embossing roller for use in embossing apparatus employing a pair of embossing rollers to apply an embossed pattern on a web of material passing between said rollers comprising:
    a magnetic roller having a cylindrical surface;
    a plurality of flexible embossing plates, each plate comprising magnetically attractable material and releasably secured to said cylindrical surface by magnetic attraction, adjacent ones of said embossing plates being disposed in contiguous relationship on said cylindrical surface to provide an uninterrupted continuous embossing pattern around said magnetic roller, each embossing plate including a backing portion and a web engaging portion having an embossing pattern thereon, said embossing pattern including projections which are extendable between other projections on the other embossing roller of such a pair of embossing rollers to physically deform said web and thereby provide said embossed pattern on said web; and
    interengagable means on said cylindrical surface of said magnetic roller and on each of said embossing plates associated therewith to align and to prevent shifting of said plates with respect to said cylindrical surface, said interengagable means comprising a first groove in said cylindrical surface around the circumference of said magnetic roller and a first projecting rib on each of said embossing plates and receivable in said first groove, said interengagable means further comprising a second groove in said cylindrical surface and extending axially of said magnetic roller, and a second projecting rib on each of said embossing plates and receivable in said second groove.

2. An embossing roller according to claim 1 wherein the edges of each of said embossing plates define a nonrectangular parallelogram, wherein said first projecting rib therein is parallel to a side edge of said plate, and wherein said second projecting rib is disposed transversely to said first projecting rib and is located near a corner of said plate.

3. An embossing roller for use in embossing apparatus employing a pair of embossing rollers to apply an embossed pattern on a web of material passing between said rollers comprising:
    a magnetic roller having a cylindrical surface;
    a plurality of flexible embossing plates, each plate having the shape of a parallelogram and comprising magnetically attractable material and releasably mounted on said cylindrical surface by magnetic attraction, adjacent ones of said embossing plates being disposed in contiguous relationship on said cylindrical surface to provide an uninterrupted continuous embossing pattern around said magnetic roller, each embossing plate including a backing portion and a web engaging portion having an embossing pattern thereon, said embossing pattern including projections which may extend between other projections on the other embossing roller of such a pair of embossing rollers; and
    interengagable means on said cylindrical surface of said magnetic roller and on each of said embossing plates associated therewith to align and to prevent shifting of said plates with respect to said cylindrical surface, said interengagable means comprising a first groove in said cylindrical surface around the circumference of said magnetic roller, a projecting rib on the backing portion of each of said embossing plates receivable in said first groove, said rib being disposed near an edge of each said plate, a second groove in said cylindrical surface and extending axially of said magnetic roller, said second groove intersecting with said first groove at an intersection, a key member disposed at said intersection, and a recess in said rib near an end thereof and engageable with said key member.

4. An embossing roller for use in embossing apparatus employing a pair of embossing rollers to apply an embossed pattern on a web of material passing between said rollers comprising:
    a magnetic roller having a cylindrical surface;
    a plurality of flexible embossing plates, each plate having the shape of a parallelogram and comprising magnetically attractable material and releasably mounted on said cylindrical surface by magnetic attraction, adjacent ones of said embossing plates being disposed in contiguous relationship on said cylindrical surface to provide an uninterrupted continuous embossing pattern around said magnetic roller, each embossing plate including a backing portion and a web engaging portion having an embossing pattern thereon, said embossing pattern including projections which may extend between other projections on the other embossing roller of such a pair of embossing rollers; and interengagable means on said cylindrical surface of said magnetic roller and on each of said embossing plates associated therewith to align and to prevent shifting of said plates with respect to said cylindrical surface, said interengagable means comprising a plurality of spaced apart first grooves in said cylindrical surface around the circumference of said magnetic roller, a projecting rib on the backing portion of each of said embossing plates receivable in one of said first grooves, said rib being disposed near an edge of each said plate, a plurality of spaced apart second grooves in said cylindrical surface and extending axially of said magnetic roller, said second grooves intersecting with said first grooves at intersections, a key member disposed at each of said intersections, and a recess in each of said ribs near an end thereof and engagable with one of said key members.

5. In embossing aparatus employing a pair of embossing rollers to apply an embossed pattern on a web of material passing between said rollers, each embossing roller comprising:

a magnetic roller having a cylindrical surface;

a plurality of flexible embossing plates, each plate comprising magnetically attractable material and releasably mounted on said cylindrical surface by magnetic attraction, adjacent ones of said embossing plates being disposed in contiguous relationship on said cylindrical surface to provide an uninterrupted continuous embossing pattern around said magnetic roller, each embossing plate including a backing portion and a web engaging portion having an embossing pattern thereon, said embossing pattern including projections which may extend between other projections on the other embossing roller of said pair of embossing rollers; and interengagable means on said cylindrical surface of said magnetic roller and on each of said embossing plates associated therewith to align and to prevent shifting of said plates with respect to said cylindrical surface, said interengagable means comprising a first groove in said cylindrical surface around the circumference of said magnetic roller and a projecting rib on each of said embossing plates and receivable in said first groove, said interengagable means further comprising a second groove in said cylindrical surface and extending axially of said magnetic roller, said second groove intersecting with said first groove at an intersection, a key member disposed at said intersection, and a recess in said rib engagable with said key member.

6. An embossing roller according to claim 5 wherein said magnetic roller comprises layers of different material along its axis and wherein said first groove is formed in that layer which is of harder material than another layer.

* * * * *